US011563855B1

United States Patent
Spivak et al.

(10) Patent No.: US 11,563,855 B1
(45) Date of Patent: Jan. 24, 2023

(54) CUSTOMIZED AUDIO MIXING FOR USERS IN VIRTUAL CONFERENCE CALLS

(71) Applicant: Meta Platforms Technologies, LLC, Menlo Park, CA (US)

(72) Inventors: Igor D. Spivak, San Francisco, CA (US); Andrew Lovitt, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/321,214

(22) Filed: May 14, 2021

(51) Int. Cl.
| | |
|---|---|
| H04M 3/56 | (2006.01) |
| H04L 67/306 | (2022.01) |
| G06F 3/01 | (2006.01) |
| G06F 3/16 | (2006.01) |

(52) U.S. Cl.
CPC ............ *H04M 3/568* (2013.01); *G06F 3/013* (2013.01); *G06F 3/165* (2013.01); *H04L 67/306* (2013.01); *H04M 3/564* (2013.01)

(58) Field of Classification Search
CPC combination set(s) only.
See application file for complete search history.

(56) References Cited

U.S. PATENT DOCUMENTS

| | | |
|---|---|---|
| 2008/0037749 A1 | 2/2008 | Metzger et al. |
| 2016/0316064 A1 | 10/2016 | Ohman et al. |
| 2017/0256094 A1 * | 9/2017 | Aratsu ................. H04N 21/812 |
| 2017/0280098 A1 * | 9/2017 | Sethuraman ........ H04L 12/1827 |
| 2020/0174739 A1 * | 6/2020 | Boss ..................... H04M 3/568 |
| 2021/0185403 A1 * | 6/2021 | Chan ............... H04N 21/47217 |

FOREIGN PATENT DOCUMENTS

| | | | | |
|---|---|---|---|---|
| CN | 105933557 | * | 9/2016 | ............ H04M 3/368 |
| KR | 20080098806 A | | 11/2008 | |

OTHER PUBLICATIONS

International Search Report and Written Opinion for International Application No. PCT/US2022/028820, dated Sep. 2, 2022, 10 pages.

* cited by examiner

*Primary Examiner* — Phung-Hoang J Nguyen
(74) *Attorney, Agent, or Firm* — Fenwick & West LLP (57) ABSTRACT

A system controls the audio focus for a user in a virtual conference call. The system retrieves sound parameters associated with participants in the virtual conference call with the user from a user profile of the user. The sound parameters define volume adjustments to be applied to audio data received from the participants for generating an audio mix customized to the user. The system receives the audio data from client devices of the participants, and for each of the participants, adjusts the audio data of the participant using the associated sound parameter of the participant. The system adds the adjusted audio data of the participants to the audio mix for the user and provides the audio mix to a client device of the user.

20 Claims, 7 Drawing Sheets

CUSTOMIZED AUDIO MIXING FOR USERS IN VIRTUAL CONFERENCE CALLS

FIELD OF THE INVENTION

This disclosure relates generally to virtual conference call systems, and more specifically to customize audio mixing for users in virtual conference calls.

BACKGROUND

In virtual conference calls, the audio data generated by each user is added to an audio mix and transmitted to the users. This allows users in the virtual conference calls to communicate with each other in a natural way, simulating aspects of being present physically present at a physical location. However, the audio mix provided to the users may become muddled when there are many participants in a virtual conference call. Furthermore, the audio data generated by different participants may have different levels of importance to a user.

SUMMARY

Embodiments relate to controlling the audio focus for a user in a virtual conference call. A virtual conference system generates a customized audio mix for each user in the virtual conference call. The audio mix for different users may be different, varying based on factors such as user preference, the context of the call, and the relationships between the users. To generate the audio mix for each user, a user profile may be associated with each user that controls the audio mix. The user profile may be stored in a database that persists across multiple virtual conference calls or multiple devices that are associated with the user profile. Each user profile includes sound parameters associated with other participants in the conference calls that define transformations to be applied to audio data received from the other participants. The sound parameters may specify audio filters applied to perform the transformations. Some examples of transformations may include a change in volume, spatialization parameters and placement, adjusting pitch, adjusting voice type, or some combination thereof. When a user joins a virtual conference call, the other participants in the virtual conference call are identified and the sound parameters associated with the other participants are retrieved from the database. The audio data of the other participants are adjusted using the retrieved sound parameters, the adjusted audio data is combined into the audio mix for the user, and the audio mix is rendered on a device of the user.

The sound parameters may be defined by user input provided during a virtual conference call or otherwise provided to the virtual conference system. For example, a user may select individuals in a virtual conference call to make them louder, quieter, muted, or spatialized. This may be achieved by selecting a virtual button or an image of a participant presented in a user interface for the virtual conference call. In other examples, the user input may be provided via voice command or eye tracking. Similarly, the user may select a subgroup (e.g., multiple users, but not all) of users in the virtual conference call to them louder, quieter, muted, or spatialized. The sound parameters may alternatively or additionally be determined programmatically based on factors such as user status (e.g., teacher in a virtual classroom) or relationships between users (e.g., subgroup membership or social graph connections).

As such, a customized audio mix for a virtual conference call can be provided to each user in the virtual conference call. The audio mix has an audio focus that is tailored to the user based on user preference, the context of the call, and the relationships between the users. Rather than providing the same audio content to all users in the same virtual conference call, different users may receive different audio mixes that are more suitable for the users. Adjustment of the audio focus allows a user to ignore others in a virtual conference call, focus on the presenter, only hear comments from friends, etc.

Some embodiments include a method for generating an audio mix that is customized to a user that participates in a virtual conference call with other participants. The method includes retrieving sound parameters with participants in the virtual conference call with the user from a user profile of the user. The sound parameters define volume adjustments to be applied to audio data received from the participants for generating the audio mix. The method includes receiving the audio data from client devices of the participants. The method further includes, for each of the participants, adjusting the audio data of the participant using the associated sound parameter of the participant. The method further includes adding the adjusted audio data of the participants to the audio mix for the user and providing the audio mix to a client device of the user.

Some embodiments include a non-transitory computer-readable medium including stored program code that, when executed one or more processors, configures the one or more processors to: retrieve sound parameters associated with participants in a virtual conference call with a user from a user profile of the user, the sound parameters defining volume adjustments to be applied to audio data received from the participants for generating an audio mix customized to the user; receive the audio data from client devices of the participants; for each of the participants, adjust the audio data of the participant using the associated sound parameter of the participant; add the adjusted audio data of the participants to the audio mix for the user; and provide the audio mix to a client device of the user.

Some embodiments include a device including speakers, one or more processors, and a memory storing program code configured to be executed by the one or more processors, the program code comprising instructions for: retrieving sound parameters associated with participants in a virtual conference call with a user from a user profile of the user, the sound parameters defining volume adjustments to be applied to audio data received from the participants for generating an audio mix customized to the user; receiving the audio data from devices of the participants; for each of the participants, adjusting the audio data of the participant using the associated sound parameter of the participant; adding the adjusted audio data of the participants to the audio mix for the user; and providing the audio mix to the speakers.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
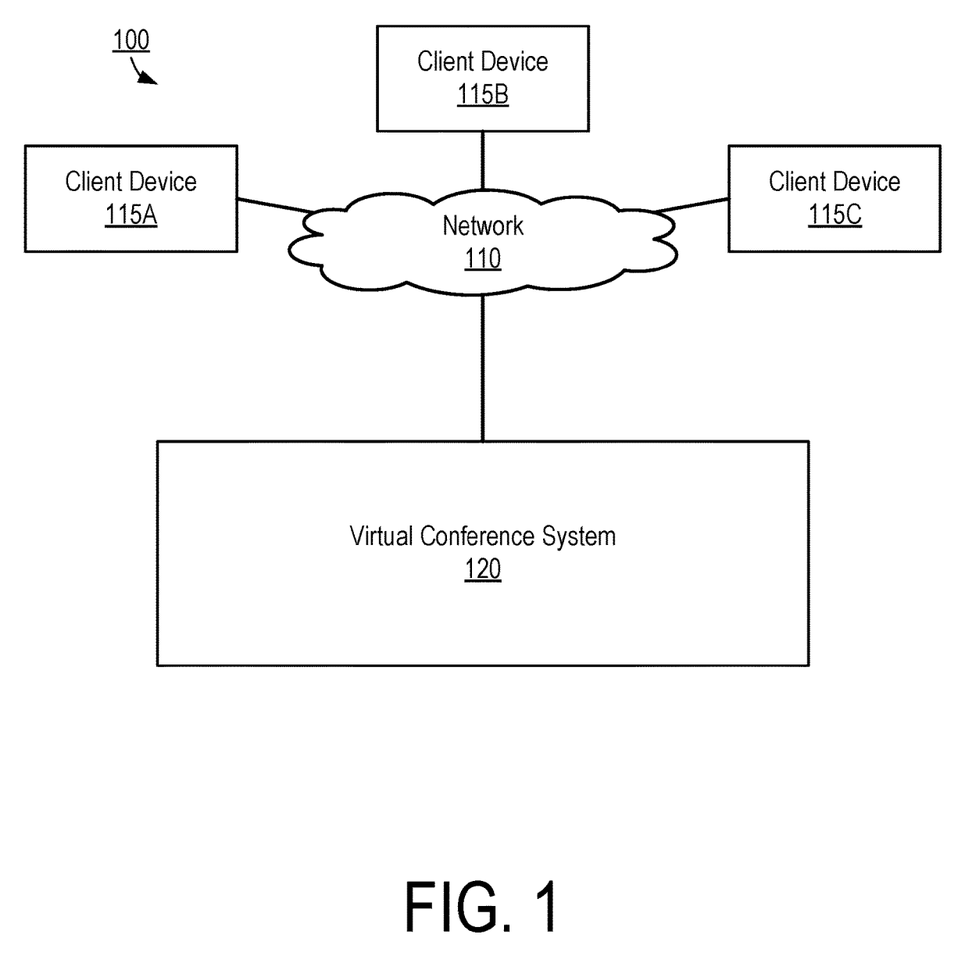
FIG. 1 is a block diagram of a system environment for a virtual conference system, in accordance with an embodiment.

FIG. 1 is a block diagram of a system environment 100 for a virtual conference system 120. The system environment 100 includes client devices 115A, 115B, and 115C (each also referred to as client device 115), a network 110, and a virtual conference system 120. In alternative configurations, different and/or additional components may be included in the system environment 100. For example, the system environment 100 may include additional client devices 115 or virtual conference systems 120.

The virtual conference system 120 facilitates virtual conference calls for users of the client devices 115. During a virtual conference call, each client device 115 generates audio data of a user captured by a microphone of the client device 115 and provides the audio data to the virtual conference system 120. For each user, the virtual conference system 120 may generate an audio mix that is customized to the user and provide the customized audio mix to the client device 115 of the user. In some embodiments, the generation of the audio mix for a user may be performed on the client device 115 of the user. Here, the client device 115 receives the audio data streams from other client devices 115 and generates the audio mix using the received streams of audio data.

To generate the customized audio mix for each user, each user may be associated with a user profile that defines sound parameters for other users. When the user joins a virtual conference call, the sound parameters associated with the other participants defined in the user profile of the user is used to adjust the audio data received from the other participants. A "user" or "participant," as used herein, refers to an endpoint in a virtual conference call. Each endpoint provides audio data that can be incorporated into audio mixes, and each endpoint may receive a customized audio mix. An endpoint may be associated with a single person, a group of people (e.g., at the same location), or a location (e.g., a conference room that includes one or more people). Each sound parameter of a participant defines a transformation of the audio data received from the participant. Some example transformations may include increasing volume, decreasing volume (e.g., muting or a smaller amount of decrease), incorporating spatialization, adjusting pitch, adjusting voice type, or some combination thereof. The sound parameters in a user profile of a user may be set by the user or may be determined programmatically by the virtual conference system 120. The virtual conference system 120 adjusts the audio data of the other participants using the associated sound parameters and adds the adjusted audio data to the audio mix for the user.

By using a user profile for each user with customizable sound parameters, the virtual conference system 100 can adjust the audio focus of the virtual conference call individually for each user. The sound parameters associated with a participant across user profiles of different users may vary. For example, audio from one participant may be made quieter for one user while made louder for another user. Different users in the same conference call may receive different audio mixes.

In some embodiments, the audio mix is synchronized with a video mix that includes image data of the users in the virtual conference call. The virtual conference system 100 generates the video mix and the audio mix for each user and provides these to the client device 115 of the user for displaying the video mix on a display and rendering the audio mix using speakers. The video mix may be presented as part of a user interface on the client device 115 that receives user inputs for controlling the sound parameters. The user may customize the user profile via the user interface. For example, the user may set the sound parameters for other participants via the user interface, such as by selection of a virtual button or an image of the participant in the user interface. In some embodiments, the virtual conference call includes only audio and no video. Additional details regarding the virtual conference system 120 are discussed below in connection with FIG. 2.

The client devices 115 are computing devices of users that participate in virtual conference calls. The client devices 115 may each include a microphone to generate audio data of the user, a camera to generate image data of the user, speakers to render the audio mix for the user, and a display to display the image data are capable of receiving user input as well as transmitting and/or receiving data via the network 110. In one embodiment, a client device 115 is a computer system, such as a desktop or a laptop computer. Alternatively, a client device 115 may be a device having computer functionality, such as a personal digital assistant (PDA), a mobile telephone, a smartphone, a tablet, an Internet of Things (IoT) device, a virtual conferencing device, a headset or head-mounted display (HMD), or another suitable device. A client device 115 is configured to communicate via the network 110. In one embodiment, a client device 115 executes an application allowing a user of the client device 115 to interact with the virtual conference system 120 by enabling voice calls, video calls, data sharing, or other interactions. For example, a client device 115 executes a browser application to enable interactions between the client device 115 and the virtual conference system 120 via the network 110. In another embodiment, a client device 115 interacts with the virtual conference system 120 through an application running on a native operating system of the client device 115, such as IOS® or ANDROID™. Additional details regarding the client device 115 are discussed below in connection with FIG. 3.

The network 110 may comprise any combination of local area and/or wide area networks, using wired and/or wireless communication systems. In one embodiment, the network 110 uses standard communications technologies and/or protocols. For example, the network 110 includes communication links using technologies such as Ethernet, 802.11 (WiFi), worldwide interoperability for microwave access (WiMAX), 3G, 4G, 5G, code division multiple access (CDMA), digital subscriber line (DSL), Bluetooth, Near Field Communication (NFC), Universal Serial Bus (USB), or any combination of protocols. In some embodiments, all or some of the communication links of the network 110 may be encrypted using any suitable technique or techniques.

Figure 2:
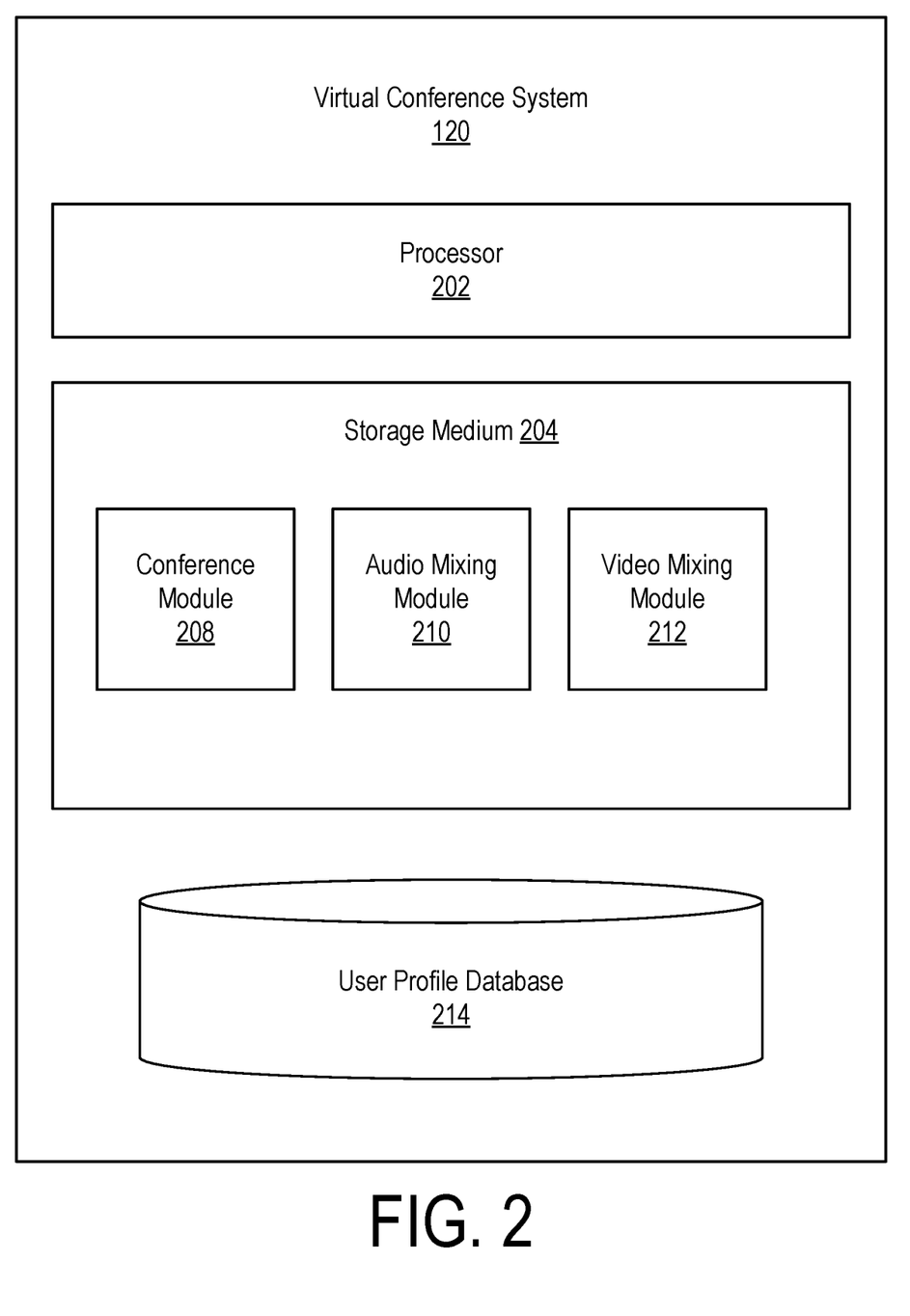
FIG. 2 is a block diagram of the virtual conference system, in accordance with an embodiment.

FIG. 2 is a block diagram of the virtual conference system 120. The virtual conference system 120 includes a processor 202, a storage medium 204, and a user profile database 214. In other embodiments, the conference system 120 may include additional, fewer, or different components. Some embodiments of the virtual conference system 120 have different components than those described here. Similarly, in some cases, functions can be distributed among the components in a different manner than is described here.

The processor 202 operates in conjunction with the storage medium 204 (e.g., a non-transitory computer-readable storage medium) to carry out various functions attributed to the virtual conference system 120 described herein. For example, the storage medium 204 may store one or more modules or applications embodied as instructions executable by the processor 202. The instructions, when executed by the processor 202, cause the processor 202 to carry out the functions attributed to the various modules or applications described herein. The processor 202 may be a single processor or a multi-processor system.

The storage medium 204 includes a conference module 208, an audio mixing module 210, and a video mixing module 212. The conference module 208 manages and hosts virtual conference rooms. For example, the conference module 208 hosts instances of virtual conference calls, connects with client devices 115 of users in the virtual conference calls, conducts audio data and video data transfers with the client devices 115, manages and updates user profiles of the users stored in the user profile database 214, receives user inputs from client devices 115 for changing sound parameters and other settings associated with virtual conference calls, programmatically determines the sound parameters and settings, stores sound parameters to the user profiles of the user profile database 214, and retrieves the sound parameters from the user profile database 214.

The sound parameters of a user profile may define transformations (e.g., volume adjustments) to be applied to the audio data received from the other participants in a virtual conference call with a user for generating an audio mix that is customized to the user. In the user profile, each participant may be associated with one or more sound parameters. The sound parameters for all participants in the virtual conference call collectively control the audio focus for the user.

A sound parameter may define a change in volume for the audio data received from a user. Different participants may have different sound parameters such that the relative volume of different users in the audio mix can be adjusted. To change the audio focus, the volume for one participant may be increased, the volume for another participant may be decreased, or both.

A sound parameter may define a spatialization of the audio data received from a user. Spatialization of audio data results in the incorporation of spatial cues to the audio data. Spatialization is another way to increase the perceptibility of audio from a user when multiple users may be speaking concurrently. When spatialized audio data is presented on two (e.g., stereo) or more speakers, there is a resulting spatial sense in the sound field. A user may select audio data of a participant to be spatialized so that the participant's voice is more immersive. When user audio is spatialized to different locations, there may also be less muddling when users speak concurrently. Different types of spatialization may be used. In some embodiments, a panning that provides left-right audio cues is used to locate the participant's voice in space when the audio mix is being rendered on loudspeakers. In some embodiments, personalized head related transfer functions (HRTFs) that provide left-right and up-down audio cues are used when the audio mix is being rendered on headphones. Sound parameters may define the activation or deactivation of spatialization, as well as spatialization parameters and the location of sound placement in the sound field.

A sound parameter may define a voice change, such as an application of an anonymizing voice algorithm, an adjustment in pitch (e.g., higher or lower), or a change in voice type (e.g., change voice to sound like a fictional character, famous person. etc.) for the audio data received from a user. The audio data of a user may be adjusted to change the voice of the user in various ways.

Each participant may be associated with more than one sound parameter that is applied to the audio data. For example, the volume of the audio data may be adjusted, and the audio data may be spatialized.

Sound parameters may be defined by user inputs. User inputs may be provided to the conference module 208 from the client device 115 of the user. For example, the conference module 208 receives a user input from the client device that specifies a sound parameter for a participant. In response, the conference module 208 associates the sound parameter with the participant in the user profile of the user, and if the user input is received during a virtual conference call, adjusts audio data received from the participant using the sound parameter. The user input may include a selection of a virtual button or an image of the participant presented in the user interface for the virtual conference call on the client device 115 of the user. For example, the user may select or touch (e.g., via touchscreen) an image of a participant in the call presented in the user interface and in response is provided an option to increase or decrease the volume of the participant. In another example, the selects a "zoom" mode for a participant in the user interface that results in the volume of the selected participant being increased while the volume of other participants are decreased when the user talks. In another example, the user selects a spatialization mode for a participant that results in spatialization of the audio data from the participant.

Figure 3:
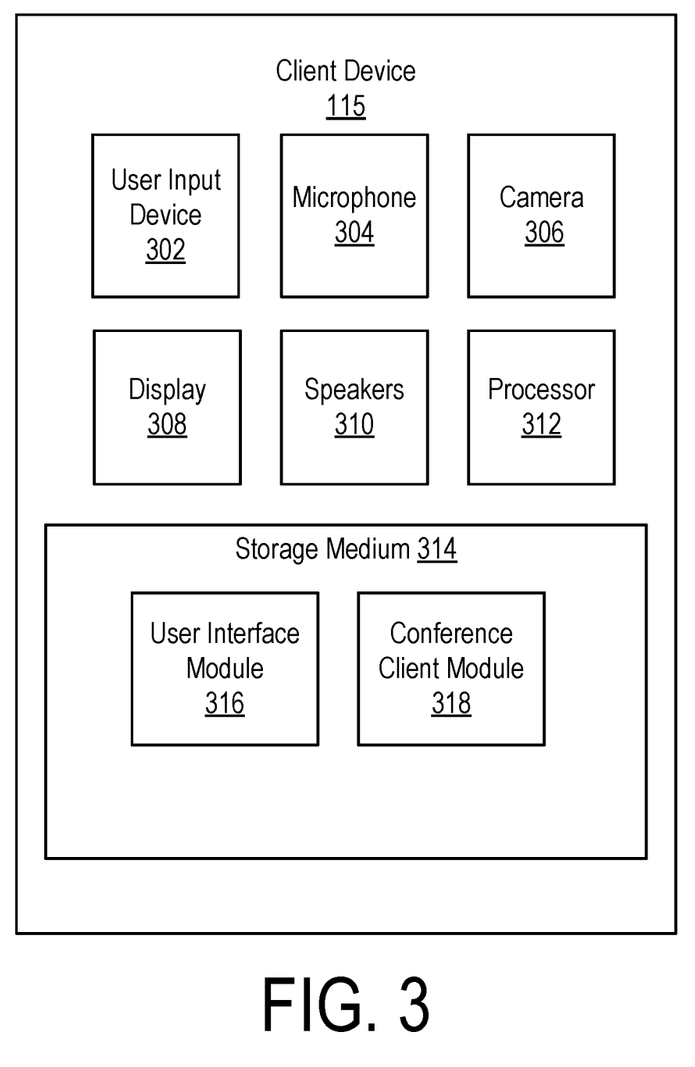
FIG. 3 is a block diagram of a client device, in accordance with an embodiment.

In some embodiments, the user input to set sound parameters may be a voice command. For example, the user may select one or more users and specify sound parameters for the users by speaking into the microphone 304. The processor 312 analyzes the audio data captured by the microphone 304 to determine the sound parameter.

In some embodiments, the user input to set sound parameters may be the eye gaze of the user. For example, images of participants in the virtual conference call may be presented in the user interface of the client device 115 of the user. The eyes of the user may be tracked, such as by using the camera or other sensor of the client device 115. The conference module 208 receives eye tracking information defining the eye gaze of the user. Based on the eye gaze of the user at an image of a participant, the sound parameter associated with the participant may be updated to increase the volume of the audio data of the participant. Furthermore, the audio data of other participants that the user is not looking at may be suppressed. As such, the eye gaze of the user can be used to set the audio focus.

Sound parameters may be determined programmatically by the conference module 208 based on the relationship between users or context of the virtual conference call. For example, sound parameters may be determined based on factors such as user status or user relationships. User status refers to the role of a user in a virtual conference call. Different users in the virtual conference call may have different status. Different statuses may be associated with different sound parameters. For example, a primary speaker status may be assigned to a user that is a leader, a main speaker of the virtual conference call, or a user that is identified as currently presenting. One example of a user that may be assigned the primary speaker status is a teacher for a virtual classroom involving the teacher and students. The conference module 208 may amplify or spatialize the audio from the user with primary speaker status. In another example, an audience status may be assigned to users that are not the leader or main speaker, such as the students in the virtual classroom. The conference module 208 may reduce the volume for audio data received from a user with audience status.

Relationships between users may be defined by subgroup membership or in a social graph. Users in a virtual conference call may be assigned to subgroups used to control the audio mixing. A virtual conference call may include one or more subgroups. In one example, sound parameters may be assigned to multiple users according to subgroup membership. In another example, when a user belongs in a subgroup, the sound parameters may define a relatively higher volume for audio data received from other users in the subgroup than for other users outside of the subgroup. Users may define subgroups, invite other users to subgroups, or join subgroups.

Multiple factors may be used to determine a sound parameter. For example, if there is a user with primary speaker status, then the volume of the user with primary speaker status may be louder than the volume for the audio data of other users in the same subgroup. This allows the primary speaker to give a presentation while users in the subgroup comment and discuss without being heard by the participants outside of the subgroup (e.g., including the primary speaker). In some embodiments, a user with the primary speaker status may assign users in the virtual conference call to subgroups or otherwise manage the subgroups, such as preventing a call participant from joining a subgroup.

A social graph may be used to determine sound parameters for users, either directly or via assignment of users into subgroups. The social graph defines relationships or connections between users (e.g., friends or acquaintances, group membership, interactions, etc.). A user's connections may be stored as part of a user profile in the user profile database 214. In another example, the user's connections may be received from a different system, such as a separate social networking system. The sound parameters for participants that are connected to the user in the social graph may define a higher volume than participants that are not connected to the user. Users may also be assigned to subgroups based the social graph, such as by grouping users that are connected in the social graph into a subgroup.

In some embodiments, a sound parameter may define a transformation to audio data applied for a predefined time. For example, a participant may be amplified or quieted in response to a user input from the user. Upon lapse of the predefined time, the sound parameter is reverted to what it was prior to the user input.

The user profile database 214 stores the user profiles of the users, including the sound parameters. The user profile and associated sound parameters may be used across multiple virtual conference calls. For example, each time a user joins a virtual conference call, the conference module 208 identifies participants on the call with the user. The conference module 208 then retrieves and applies sound parameters from the user profile of the user in accordance with the identified participants. The user may dynamically adjust the sound parameters associated with one or more of the call participants during (or outside of) the call. The sound parameters stored in the user profile database 214 may be updated based on the user adjustments. As such, the sound parameters may be persisted across multiple virtual conference calls. In some embodiments, the user profile of the user may also include other information such as biographical information, account information, login and password information, social graph information, etc.

The audio mixing module 210 generates the audio mix for each user in the virtual conference call. During the virtual conference call, the audio mixing module 210 receives audio data from the client devices 115 of the users in the virtual conference call, such as from the conference module 208 or directly from the client devices 115. For each user, the audio mixing module 210 adjusts the audio data from the participants using the associated sound parameters. The audio mixing module 210 adds the adjusted audio data of the participants to the audio mix for the user. The audio mixing module 210 provides the audio mix to the client device 115 of the user, either directly or through the conference module 208.

The video mixing module 212 receives video data from the client devices 115 of the users in the conference call, either directly or through the conference module 208. The video mixing module 212 generates a video mix for each user using the video data. Generating the video mix may include determining participants to be included in the video mix, determining a layout for images of the determined participants, and combining the video data based on the layout. In one example, images of participants are tiled in the video mix at different locations. In some embodiments, each user profile may also include video parameters defining presentation settings associated with the video data. For example, images of a user (e.g., having a primary speaker status or selected by user input) may be presented in larger size or otherwise more prominently in the video mix than images of other users. In another example, users in subgroup may be presented in larger size or otherwise more prominently in the video mix than users outside of the subgroup. In another example, a video parameter may define a visual filter that is applied to the image of the user.

FIG. 3 is a block diagram of a client device 115. The client device includes a user input device 302, a microphone 304, a camera 306, a display 308, speakers 310, a processor 312, and a storage medium 314. In other embodiments, the client device 115 may include additional, fewer, or different components. In some cases, functions can be distributed among the components in a different manner than is described here.

The user input device 302 includes hardware that enables a user to interact with virtual conference calls. The user input device 302 can include, for example, a touchscreen interface, a game controller, a keyboard, a mouse, a joystick, a voice command controller, a gesture recognition controller, a remote control receiver, an eye tracking controller, or other input device. In some embodiments, the display 308 and the user input device 302 are integrated together, such as in a touchscreen interface. In some embodiments, user inputs may be provided over the network 110 from the client device 115 to the virtual conference system 120. For example, an application executing on the client device 115 may send commands over the network 110 to participate in virtual conference calls based on user interactions with the client device 115.

The microphone 304 captures ambient audio signals by converting sound into electrical signals that can be stored or processed by other components. The captured audio data may be transmitted to the virtual conference system 120 or other client devices 115 during a virtual conference call. Additionally, the captured audio signals may be processed to identify voice commands for controlling functions of the virtual conference call. In an embodiment, the microphone 304 includes one or more integrated microphones. Alternatively, an external microphone may be coupled to the client device 115 via a communication link (e.g., the network 110 or other direct communication link). The client device 115 may include a single microphone or an array of microphones. In the case of a microphone array, the client device 115 may process audio data from multiple microphones to generate one or more beamformed audio channels each associated with a particular direction (or range of directions).

The camera 306 captures images and/or video signals. The images data or video data may be sent to the virtual conference system 120 during a virtual conference call to provide a view of the user for the other participants. Furthermore, in an embodiment, images or video from the camera 306 may be processed to for face detection, eye gaze detection, face recognition, gesture recognition, or other information that may be utilized to control functions of the virtual conference call.

The display 308 presents images or video content, as well as the user interface of virtual conference calls. For example, the display 308 may comprises an LED display panel, an LCD display panel, a projector, a virtual reality headset, an augmented reality headset, another type of display device, or an interface for connecting to any of the above-described display devices.

The speakers 310 render sound based on received audio data. For example, the speakers 310 render the audio mix for the user during the virtual conference call. The client device 115 may include one or more speakers. Multiple speakers may be used to render spatialized audio data. The speakers 310 may be integrated with the client device 115 or may be an interface for coupling the client device 115 with one or more external speakers. The speakers 310 may output audio in multiple channels to generate beamformed or spatialized audio signals that give the listener a sense of directionality associated with the audio. For example, the speakers 310 may generate audio output as a stereo audio output or a multi-channel audio output such as 2.1, 3.1, 5.1, 7.1, or other standard configuration. The speakers 310 may include headphones or loudspeakers.

The processor 312 operates in conjunction with the storage medium 314 (e.g., a non-transitory computer-readable storage medium) to carry out various functions attributed to the client device 115 described herein. The storage medium 314 may store one or more modules or applications embodied as instructions executable by the processor 312. The processor 312 may comprise a single processor or a multi-processor system. The storage medium 314 includes a user interface module 316 and a conference client module 318. In alternative embodiments, the storage medium 150 may comprise different or additional components.

The user interface module 316 includes visual and/or audio elements and controls for enabling user interaction with the virtual conference call. For example, the user interface module 316 may receive inputs from the user input device 302 to enable the user to join virtual conference calls and specify sound parameters. The user interface may also include various control elements for setting the sound parameters, such as user-level or subgroup-level volume control or spatialization control.

The conference client module 318 executes client operations for virtual conference calls. For example, the conference client module 318 provides the audio data captured by the microphone 304 and the video data captured by the camera 306 to the virtual conference system 120. The conference client module 318 also provides user inputs from the user input device 302 to the virtual conference system 120. The conference client module 318 receives the audio mix for the user generated using the sound parameters from the virtual conference system 120 and provides the audio mix to the speakers 310. The conference client module 318 may also receive a video mix from the virtual conference system 120 and provide the video mix to the display 308. In some embodiments, the conference client module 318 executes an application that facilitates the virtual conference call. For example, the application may be a browser application or an application running on a native operating system of the client device 115. The application may allow the user to set up user profiles, join or leave virtual conference calls, provide user inputs for controlling the virtual conference calls, etc.

In some embodiments, some or all the components of the virtual conference system 120 may be located on a client device 115. Similarly, some or all the functionality discussed as being performed by the virtual conference system 120 may be performed by the client device 115. For example, the storage medium 314 of the client device 115 may include a conference module 208, an audio mixing module 210, or a video mixing module 212. The client device 115 may retrieve the user profile and associated sound parameters from the user profile database 214 of the virtual conference system 120 to facilitate generating an audio mix for the user. In another example, the user profile may be stored locally at the client device 115, such as in the storage medium 314.

In some embodiments, generation of the mixed stream for a user may be performed by the client device 115 of the user when end-to-end encryption is used on the audio data. Each client device 115 generates the audio data and encrypts the audio data. The client device 115 of a user receives audio streams and decrypts the audio streams, and then generates the mixed stream for the user using the decrypted audio streams. The encrypted audio data may be transmitted between the client devices via the virtual conference system 120, or the virtual conference system 120 does not receive the encrypted audio data.

Figure 4A:
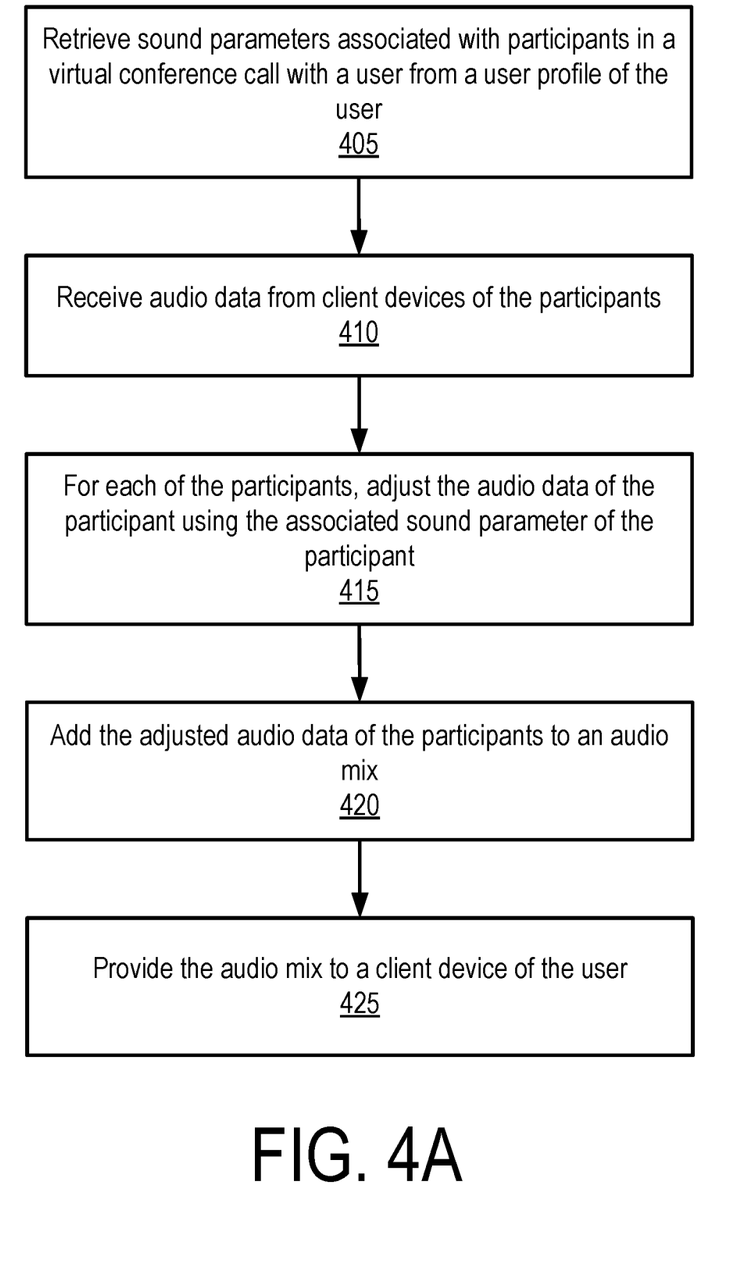
FIG. 4A is a flowchart illustrating an example method for generating an audio mix for a user in a virtual conference call, in accordance with an embodiment.

FIG. 4A is a flowchart illustrating an example method for generating an audio mix for a user in a virtual conference call. The steps of FIG. 4A may be performed by the virtual conference system 120, though in other embodiments, some or all of the steps may be performed by other entities or systems. For example, some or all of the steps may be performed by a client device 115, such as in a peer-to-peer configuration for virtual conference calls, as discussed in greater detail below in connection with FIG. 4B. In addition, other embodiments may include different, additional, or fewer steps than those shown in FIG. 4A, and the steps may be performed in different orders.

The virtual conference system 120 retrieves 405 sound parameters associated with participants in a virtual conference call with a user from a user profile of the user. The sound parameters define transformations, such as volume adjustments or spatialization, to be applied to audio data received from the participants for generating an audio mix customized to the user. When the user joins the virtual conference call, the virtual conference system 120 identifies the participants on the call with the user, and retrieves the sound parameters of the participants from the user profile of the user stored in the user profile database 214.

The virtual conference system 120 receives 410 audio data from client devices 115 of the participants. The audio data may be generated by the microphones 304 of the client devices 115. The client devices transmit the audio data to the virtual conference system 120 via the network 110. The audio data may include streams of audio data that are transmitted during the virtual conference call to facilitate conversation between the users in the call.

The virtual conference system 120 adjusts 415, for each of the participants in the virtual conference call with the user, the audio data of the participant using the associated sound parameter of the participant. Each sound parameter may define one or more filters that are applied to the audio data to transform the audio data.

The virtual conference system 120 adds 420 the adjusted audio data of the participants to the audio mix for the user. The audio mix may be a stream of audio data that is generated during the virtual conference call. The audio data for some or all the participants in the virtual conference call may be adjusted using the sound parameters. The audio data that is not adjusted using sound parameters may be combined with the adjusted audio data of other participants. By applying the sound parameters to the audio data, the audio focus of the audio mix can be adjusted for the user. The sound parameters may change during the virtual conference call, either based on user input or programmatically, resulting in change in the audio focus.

The virtual conference system 120 provides 425 the audio mix to a client device 115 of the user. For example, the audio mix may be streamed to the client device 115 via the network 110 for the duration of the virtual conference call. The audio mix is rendered by speakers 310 of the client device 115. In some embodiments, the virtual conference system 120 also receives video data captured by cameras 306 of the client devices 115 and generates a video mix for the user that is synchronized with the audio mix. The video mix is provided to the client device 115 for presentation with the audio mix by the display 308.

The method of FIG. 4A may be performed for each user in the virtual conference call to generate a customized audio mix for each user. A user profile may be stored for each user that includes sound parameters for the other participants that are used to generate the audio mix for the user.

Figure 4B:
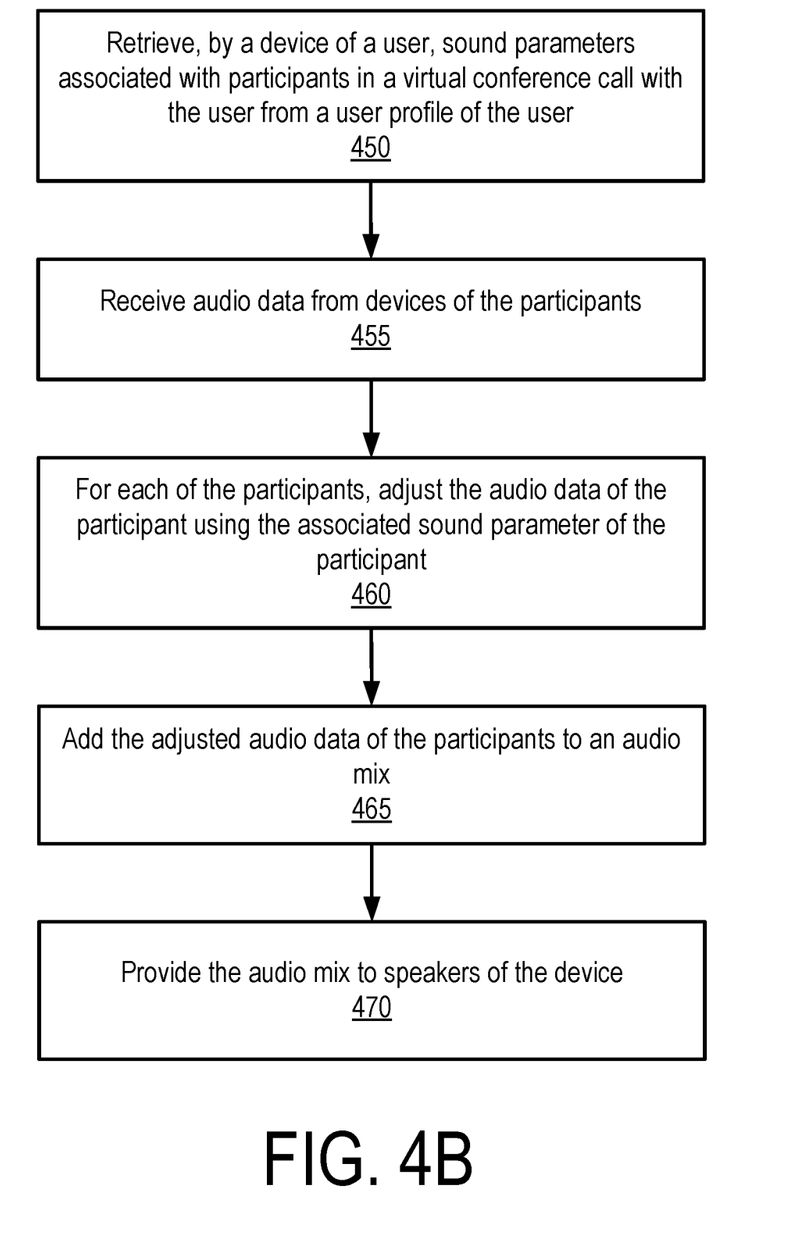
FIG. 4B is a flowchart illustrating an example method for generating an audio mix for a user in a virtual conference call by a device of the user, in accordance with an embodiment.

FIG. 4B is a flowchart illustrating an example method for generating an audio mix for a user in a virtual conference call by a device of the user. Here, the generation of the audio mix for a user is performed by the device of the user, such as a client device 115. In addition, other embodiments may include different, additional, or fewer steps, and the steps may be performed in different orders.

The device of a user retrieves 450 sound parameters associated with participants in a virtual conference call with the user from a user profile of the user. The sound parameters may be retrieved from the virtual conference system 120, such as from the user profile database 214. In other embodiments, the sound parameters may be retrieved from a local storage of the device, such as the storage medium 314 of the client device 115.

The device receives 455 audio data from devices of the participants. The audio data may be received from the other devices of the participants via the network 110, either directly from the other devices or via the virtual conference system 120. In some embodiments, the audio data from the devices may be encrypted using an end-to-end encryption to secure the audio data.

For each of the participants, the device adjusts 460 the audio data of the participant using the associated sound parameter of the participant. Here, the adjustments to the audio data are performed locally at the device rather than at the virtual conference system 120. In some embodiments, the device receives encrypted audio data from the other devices and decrypts the audio data prior to the adjustment using sound parameters.

The device adds 465 the adjusted audio data of the participants to an audio mix. The audio mix is customized to the user of the device based on the adjustments to the audio data using the sound parameters. As such, generating the audio mix for the user is performed locally at the device of the user.

The device provides 470 the audio mix to the speakers of the device. For example, the speakers 310 of the client device 115 receive the audio mix and render the audio mix during the virtual conference call for the user.

Figure 5:
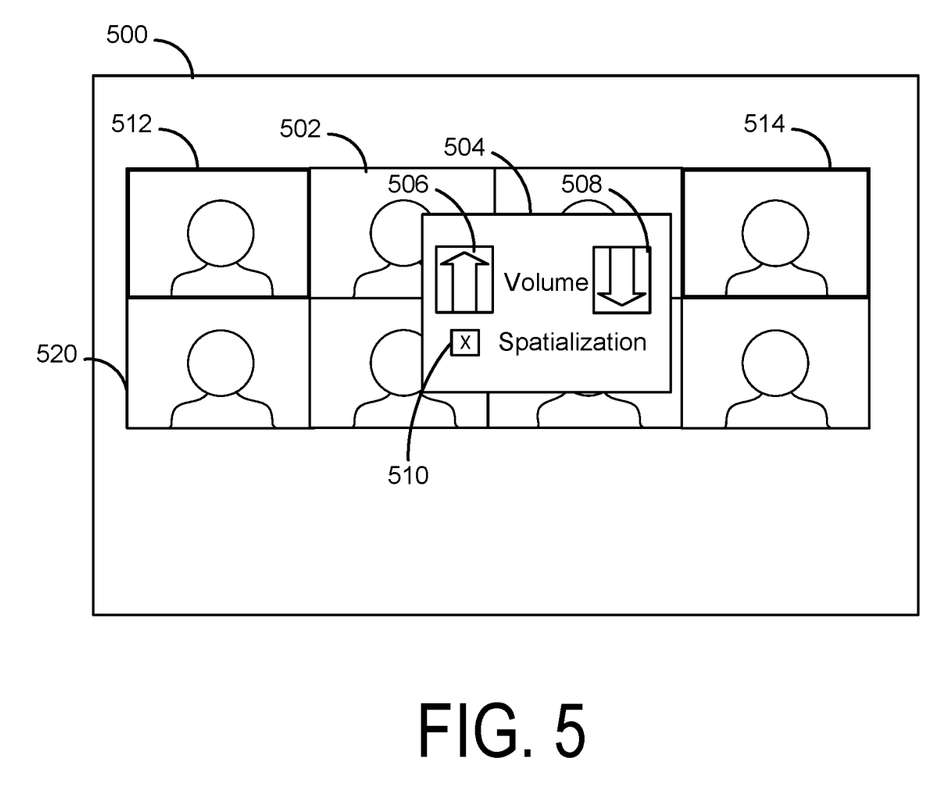
FIG. 5 is an example of a user interface for a virtual conference call, in accordance with an embodiment.

FIG. 5 is an example of a user interface 500 for a virtual conference call. The user interface 500 is presented by the display 308 of the client device 115 of the user while the user is connected to the virtual conference call. The user interface 500 includes images of some or all participants, such as participant 502, that are in the virtual conference call with the user. In response to a selection of an image of the participant 502, a menu 504 is provided to the user interface 500 for specifying sound parameters of the participant 502. The menu 504 includes an increase volume button 506 to increase the volume of the participant 502, a decrease volume button 508 to decrease the volume of the participant 502, and a spatialization button 510 to activate or deactivate spatialization for the participant 502.

The spatialization applied to a participant may be based on the location of the participant within the user interface 500. For example, the audio data of participant 512 on the left side of the user interface 500 may spatialized such that the user perceives sound from the participant 512 arriving from the left side of the user. In another example, audio data of participant 514 on the right side of the user interface 500 may spatialized such that the user perceives sound from the participant 512 arriving from the right side of the user. As a result, the perceptibility of the audio from the participants 512 and 514 is increased, even when these participants speak concurrently.

In some embodiments, the volume and/or spatialization applied to a participant may be based on eye gaze of the user at the participants presented in the user interface 500. For example, when the user looks at the participant 512, the volume for the audio from the participant 512 may be increased relative to the volume for audio from other participants that the user is not looking at.

In some embodiments, the user interface 500 facilitates adjustment of audio data using subgroups. For example, participants 512 and 514 may belong to a subgroup along with the user of the user interface 500. The audio data from the participants 512 and 514 may have increased volume relative to a participant 520 that is outside of the subgroup. Subgroup membership may be indicated in the user interface 500, such as by using a thicker border for the participants 512 and 514. In some embodiments, the user along with the participants 512 and 514 in the subgroup may have a private audio channel where users outside of the subgroup cannot hear their discussion. Here, the users in the subgroup are effectively muted for users outside of the subgroup. The user interface 500 may allow the user to join the subgroup, invite or add other participants to the subgroup, and specify sound parameters for the subgroup.

Figure 6:
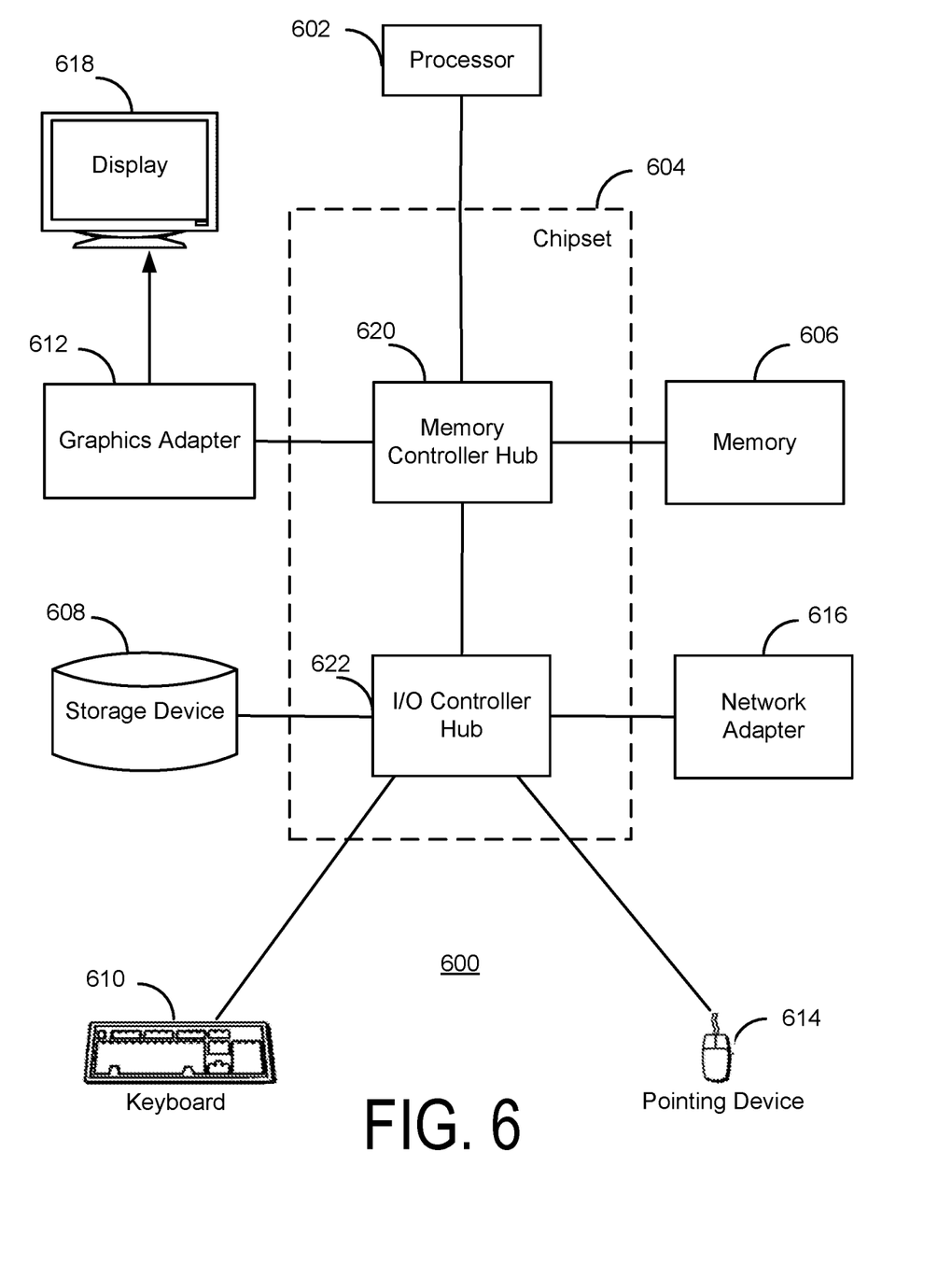
FIG. 6 is a block diagram of a of a computer, in accordance with an embodiment.

FIG. 6 is a block diagram of a of a computer 600. The computer 600 is an example of a computing device including circuitry that implements a component of the system environment 100, such as a server or other computing device of the virtual conference system 120 or a client device 115. Illustrated are at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display device 618 is coupled to the graphics adapter 612. A storage device 608, keyboard 610, pointing device 614, and network adapter 616 are coupled to the I/O controller hub 622. The computer 600 may include various types of input or output devices. Other embodiments of the computer 600 have different architectures. For example, the memory 606 is directly coupled to the processor 602 in some embodiments.

The storage device 608 includes one or more non-transitory computer-readable storage media such as a hard drive, compact disk read-only memory (CD-ROM), DVD, or a solid-state memory device. The memory 606 holds program code (e.g., instructions) and data used by the processor 602. The program code may correspond to the processing aspects described with reference to FIGS. 1 through 5.

The pointing device 614 is used in combination with the keyboard 610 to input data into the computer system 600. The graphics adapter 612 displays images and other information on the display device 618. In some embodiments, the display device 618 includes a touch screen capability for receiving user input and selections. The network adapter 616 couples the computer system 600 to a network. Some embodiments of the computer 600 have different and/or other components than those shown in FIG. 6.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method, comprising:
retrieving sound parameters associated with participants in a virtual conference call with a user from a user profile of the user, the sound parameters defining volume adjustments to be applied to audio data received from the participants for generating an audio mix customized to the user;
receiving the audio data from client devices of the participants;
for each of the participants, adjusting the audio data of the participant using the associated sound parameter of the participant;
adding the adjusted audio data of the participants to the audio mix for the user;
providing the audio mix to a client device of the user; and
determining a subgroup including a subset of the participants in the virtual conference call, wherein the sound parameters define a higher volume for audio data received from the subset of participants in the audio mix than for audio data received from a first participant in the virtual conference call that is outside of the subgroup.

2. The method of claim 1, wherein a sound parameter associated with a participant of the participants in the virtual conference call defines an increase in volume for the audio data received from the participant.

3. The method of claim 1, wherein a sound parameter associated with a participant of the participants in the virtual conference call defines a decrease in volume for the audio data received from the participant.

4. The method of claim 1, wherein:
the participants in the conference call include a first participant and a second participant;
a first sound parameter associated with the first participant defines an increase in volume for first audio data received from the first participant; and
and a second sound parameter associated with the second participant of the participants defines a decrease in volume for second audio data received from the second participant.

5. The method of claim 1, wherein a sound parameter associated with a participant of the participants in the virtual conference call is used across multiple virtual conference calls for audio data of the participant.

6. The method of claim 5, wherein the sound parameter associated with the participant is retrieved from a social graph of connected users.

7. The method of claim 1, further comprising:
receiving a user input from the client device that specifies a sound parameter for a participant of the participants in the virtual conference call; and
responsive to the user input, associating the sound parameter with the participant in the user profile of the user.

8. The method of claim 7, wherein the user input includes a selection of a virtual button or an image of the participant, the virtual button or image being presented in a user interface for the virtual conference call on the client device.

9. The method of claim 1, wherein a sound parameter associated with a participant of the participants in the virtual conference call defines a spatialization for the audio data received from the participant.

10. The method of claim 1, wherein the sound parameters define a lower volume for the audio data received from the subset of participants than a second participant in the virtual conference call having a primary speaker status.

11. The method of claim 1, wherein the subgroup is defined by a participant having a primary speaker status for the virtual conference call.

12. The method of claim 1, further comprising determining a sound parameter associated with a participant of the participants in the virtual conference call based on a status of the participant.

13. The method of claim 1, further comprising determining a sound parameter associated with a participant of the participants in the virtual conference call based on eye gaze of the user at an image of the participant presented in a user interface for the virtual conference call on the client device.

14. The method of claim 1, further comprising:
adjusting the audio data of the participants using second sound parameters from a second user profile of a second user in the virtual conference call, wherein a second sound parameter associated with at least one participant is different from a sound parameter associated with the at least one participant from the user profile of the user;
adding the adjusted audio data of the participants using the second sound parameters to a second audio mix for the second user; and
providing the second audio mix to a second client device of the second user.

15. A non-transitory computer-readable storage medium comprising stored program code that, when executed one or more processors of a device, causes the device to:
retrieve sound parameters associated with participants in a virtual conference call with a user from a user profile of the user, the sound parameters defining volume adjustments to be applied to audio data received from the participants for generating an audio mix customized to the user;
receive the audio data from client devices of the participants;
for each of the participants, adjust the audio data of the participant using the associated sound parameter of the participant;
add the adjusted audio data of the participants to the audio mix for the user;
provide the audio mix to a client device of the user; and
determine a subgroup including a subset of the participants in the virtual conference call, wherein the sound parameters define a higher volume for audio data received from the subset of participants in the audio mix than for audio data received from a first participant in the virtual conference call that is outside of the subgroup.

16. The computer-readable storage medium of claim 15, further comprising stored instructions that when executed cause the device to:
receive a user input from the client device that specifies a sound parameter for a participant of the participants in the virtual conference call; and
responsive to the user input, associate the sound parameter with the participant.

17. A device, comprising:
speakers;
one or more processors; and
a memory storing program code that when executed by the one or more processors, cause the device to:
retrieve sound parameters associated with participants in a virtual conference call with a user from a user profile of the user, the sound parameters defining volume adjustments to be applied to audio data received from the participants for generating an audio mix customized to the user;
receive the audio data from devices of the participants;
for each of the participants, adjusting the audio data of the participant using the associated sound parameter of the participant;
add the adjusted audio data of the participants to the audio mix for the user;
provide the audio mix to the speakers, and
determine a subgroup including a subset of the participants in the virtual conference call, and wherein the sound parameters define a higher volume for audio data received from the subset of participants in the audio mix than for audio data received from a participant in the virtual conference call that is outside of the subgroup.

18. The device of claim 17, wherein a sound parameter associated with a participant of the participants in the virtual conference call defines a spatialization for the audio data received from the participant.

19. The device of claim 17, wherein the sound parameters define a lower volume for the audio data received from the subset of participants than a second participant in the virtual conference call having a primary speaker status.

20. The device of claim 17, wherein the subgroup is defined by a participant having a primary speaker status for the virtual conference call.

* * * * *

UNITED STATES PATENT AND TRADEMARK OFFICE
CERTIFICATE OF CORRECTION

PATENT NO. : 11,563,855 B1
APPLICATION NO. : 17/321214
DATED : January 24, 2023
INVENTOR(S) : Igor D. Spivak et al.

Page 1 of 1

It is certified that error appears in the above-identified patent and that said Letters Patent is hereby corrected as shown below:

In the Claims

In Column 14, Lines 63-64, Claim 4, delete "and and" and insert -- and --, therefor.

In Column 16, Line 15, Claim 16, delete "The computer-readable storage medium of claim" and insert -- The non-transitory computer-readable storage medium of claim --, therefor.

Signed and Sealed this
Tenth Day of October, 2023

Katherine Kelly Vidal
*Director of the United States Patent and Trademark Office*